US010772156B2

(12) United States Patent
Shim

(10) Patent No.: US 10,772,156 B2
(45) Date of Patent: Sep. 8, 2020

(54) ELECTRONIC APPARATUS AND METHOD OF CONTROLLING THE SAME

(71) Applicant: Samsung Electronics Co., Ltd., Suwon-si, Gyeonggi-do (KR)

(72) Inventor: Woo-chul Shim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/071,771

(22) PCT Filed: Dec. 5, 2016

(86) PCT No.: PCT/KR2016/014152
§ 371 (c)(1),
(2) Date: Jul. 20, 2018

(87) PCT Pub. No.: WO2017/135557
PCT Pub. Date: Aug. 10, 2017

(65) Prior Publication Data
US 2019/0029069 A1    Jan. 24, 2019

(30) Foreign Application Priority Data

Feb. 1, 2016  (KR) .......................... 10-2016-0012361

(51) Int. Cl.
*H04W 88/02* (2009.01)
*H04L 29/06* (2006.01)
(Continued)

(52) U.S. Cl.
CPC .......... *H04W 88/02* (2013.01); *G06F 1/1698* (2013.01); *G06F 3/02* (2013.01); *H04L 63/0492* (2013.01);
(Continued)

(58) Field of Classification Search
CPC ....... H04W 88/02; H04W 4/80; G06F 1/1698; G06F 3/02; H04L 63/0492
(Continued)

(56) References Cited

U.S. PATENT DOCUMENTS

2012/0208500 A1* 8/2012 Ledlie .................. H04M 1/67
455/410
2013/0252547 A1   9/2013 Cho et al.
(Continued)

FOREIGN PATENT DOCUMENTS

EP    2 355 563 A1    8/2011
EP    2 814 273 A1    12/2014
(Continued)

OTHER PUBLICATIONS

European Search Report dated Oct. 15, 2018, issued in European Patent Application No. 16889535.7.
(Continued)

*Primary Examiner* — Congvan Tran
(74) *Attorney, Agent, or Firm* — Jefferson IP Law, LLP

(57) ABSTRACT

An electronic device of the present disclosure includes: a communicator configured to communicate with an external device; and a controller configured to perform control for connecting with a user terminal of transmitting a first communication signal having a first signal strength when the first communication signal is received through the communicator, receiving information about connection with a communication relay from the connected user terminal, and connecting with the communication relay of transmitting a second communication signal having a second signal strength lower than the first signal strength through the communicator based on the received connection information. Thus, an IoT device can have safe access to a wireless AP through a user terminal.

7 Claims, 13 Drawing Sheets

(51) Int. Cl.
*H04W 4/80* (2018.01)
*H04W 76/10* (2018.01)
*H04W 48/08* (2009.01)
*H04W 12/06* (2009.01)
*H04W 12/00* (2009.01)
*G06F 1/16* (2006.01)
*G06F 3/02* (2006.01)
*H04W 4/70* (2018.01)

(52) U.S. Cl.
CPC ........... *H04W 4/80* (2018.02); *H04W 12/003* (2019.01); *H04W 12/06* (2013.01); *H04W 48/08* (2013.01); *H04W 76/10* (2018.02); *H04W 4/70* (2018.02); *H04W 12/00403* (2019.01)

(58) Field of Classification Search
USPC ................. 455/550.1, 41.2, 556.1, 556.2
See application file for complete search history.

(56) References Cited

U.S. PATENT DOCUMENTS

| | | | | |
|---|---|---|---|---|
| 2014/0004861 | A1* | 1/2014 | Choi | H04W 76/16 455/437 |
| 2015/0085725 | A1 | 3/2015 | Estevez et al. | |
| 2015/0110052 | A1* | 4/2015 | Venkatachalam | H04W 76/14 370/329 |
| 2015/0172061 | A1* | 6/2015 | Lee | H04W 12/04 713/176 |
| 2016/0150358 | A1* | 5/2016 | Ko | H04L 67/34 455/41.1 |
| 2016/0373270 | A1 | 12/2016 | Yang et al. | |
| 2017/0150337 | A1* | 5/2017 | Bareket | H04W 76/14 |
| 2017/0303258 | A1* | 10/2017 | Zhang | H04W 72/048 |

FOREIGN PATENT DOCUMENTS

| | | |
|---|---|---|
| KR | 10-2013-0013238 A | 2/2013 |
| KR | 10-2013-0080487 A | 7/2013 |
| WO | 2014/178605 A1 | 11/2014 |
| WO | 2015/093906 A1 | 6/2015 |
| WO | 2015/119394 A1 | 8/2015 |

OTHER PUBLICATIONS

European Search Report dated Mar. 11, 2019; European Appln. 16 889 535.7-1213.

European Office Action dated Jul. 24, 2019; Application #: 16 889 535.7-1213; Reference #: P258259EP/OKS.

* cited by examiner

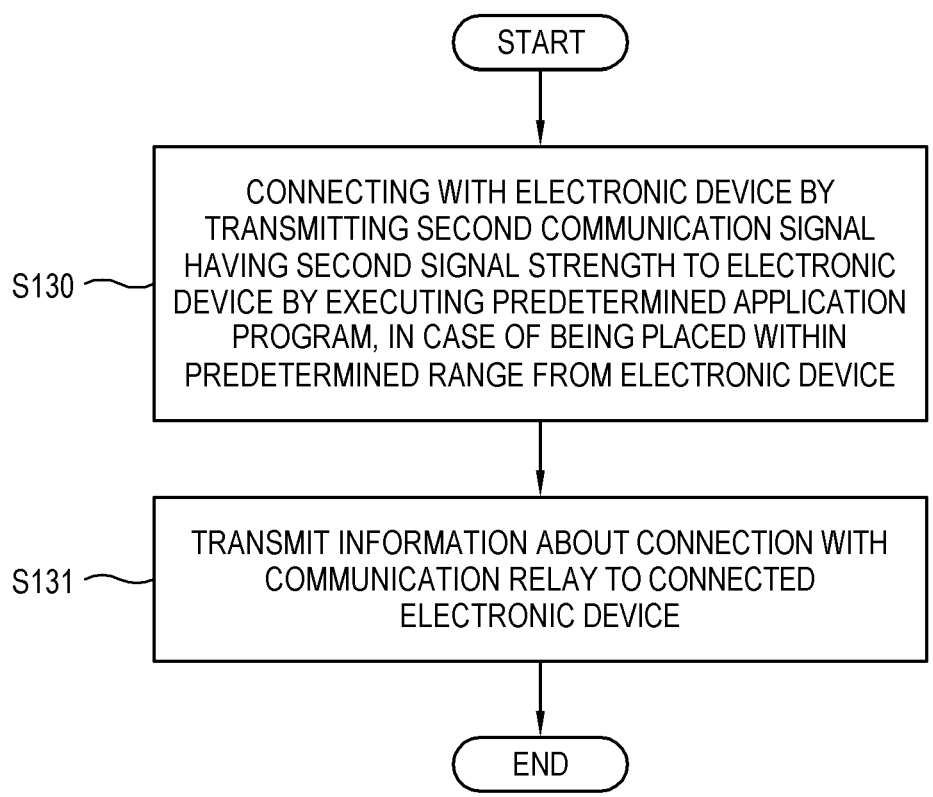

ELECTRONIC APPARATUS AND METHOD OF CONTROLLING THE SAME

TECHNICAL FIELD

The present disclosure relates to an electronic device, a display apparatus and a control method thereof, and more particularly to an electronic device, a display apparatus and a control method thereof, in which the electronic device is connected to a wireless access point through a terminal of a user.

BACKGROUND ART

With recent development of wireless technology, people have used a wireless network instead of a wired network. Since the wireless technology is free from constraint on mobility of the wired network, researches have been actively made on various techniques using the wireless network.

In a case of a wireless local area network (WLAN), so-called wireless fidelity (Wi-Fi) allows a smart phone and the like to use the Internet within a predetermined range from an access point (AP).

Besides the smart phone, various Internet-of-things (IoT) have recently been configured to have a Wi-Fi function. For example, most of a closed circuit television (CCTV), a robot vacuum cleaner, a microwave oven, an air conditioner, a washing machine, a loudspeaker, and the like electronic products can have access to the Internet through Wi-Fi.

However, such an IoT device may be constrained from having access to the wireless AP since it does not have a display, an input unit, etc.

Further, when the IoT device accesses the wireless AP, there may be security concerns with a separate registration process required of a user, access to another hub device undesired by a user, etc.

DISCLOSURE

Technical Problem

Accordingly, an object of the present disclosure is to provide an electronic device, a display apparatus and a control method thereof, in which a user's terminal is used to safely connect the electronic device to the wireless access point.

Further, another object of the present disclosure is to provide an electronic device, a display apparatus and a control method thereof, in which strength of a signal for communication between a user's terminal and the electronic device is used to connect the electronic device to a wireless access point.

Further, still another object of the present disclosure is to provide an electronic device, a display apparatus and a control method thereof, by which a user can easily connect the electronic device and a wireless access point.

Technical Solution

The object of the present disclosure is achieved by providing an electronic device including: a communicator configured to communicate with an external device; and a controller configured to perform control for connecting with a user terminal of transmitting a first communication signal having a first signal strength when the first communication signal is received through the communicator, receiving information about connection with a communication relay from the connected user terminal, and connecting with the communication relay of transmitting a second communication signal having a second signal strength lower than the first signal strength through the communicator based on the received connection information. According to such an embodiment of the present disclosure, the IoT device can have safe access to the wireless AP through the user terminal such as the smart phone or the like. Further, the IoT device can connect with each of the user terminal and the wireless AP in accordance with the signal strength of the communication.

The electronic device may further include a user input configured to receive an input of a user, wherein the controller connects with the user terminal of transmitting the first communication signal having the first signal strength in response to the first input of the user, and connects with the communication relay of transmitting the second communication signal having the second signal strength in response to the second input of the user. Thus, the IoT device connects with the user terminal of the strongest signal strength in response to the first user input, and connects with the wireless AP designated by the user terminal in response to the second user input. That is, a user can easily control for connection with the user terminal, and connect the electronic device with the wireless AP based on the information about the connection with the wireless AP desired for connection in the user terminal, for example, the SSID and the password.

The controller may connect with the user terminal of transmitting the first communication signal having the first signal strength based on repetitive inputs of a user, when connecting with the external device of transmitting a third communication signal having a third signal strength higher than the first signal strength based on the first input of the user. Thus, the IoT device can connect with the user terminal of the next strongest signal strength in response to repetitive inputs of a user, when connecting with the undesired device having the strongest signal strength in response to the first input of a user.

The controller may connect with the user terminal of transmitting the first communication signal having the first signal strength, when the user terminal is placed within a predetermined range from the electronic device. Thus, when the user terminal moves near the IoT device, it is possible to connect with the user terminal by the strongest signal strength.

The information about the connection with the communication relay may include a service set identifier (SSID) for accessing the communication relay and a password needed for the access. Thus, information for connecting with the AP is obtained from the user terminal, and used for connection with the wireless AP.

The user input includes at least one button provided at an outer side of the electronic device. Thus, the IoT device is connected to the user terminal and the wireless AP in sequence by only the button input in accordance with the signal strength.

The communicator may include at least one of a wireless fidelity (Wi-Fi) module and a near field communication (NFC) module. Thus, the IoT device can connect with the user terminal in the proximity thereof by the Wi-Fi or NFC communication method.

The object of the present disclosure is achieved by providing a method of controlling an electronic device, the method including: connecting with a user terminal of transmitting a first communication signal having a first signal strength when the first communication signal is received through a communicator; receiving information about connection with a communication relay from the connected user terminal; and connecting with the communication relay of transmitting a second communication signal having a second signal strength lower than the first signal strength through the communicator based on the received connection information. According to such an embodiment of the present disclosure, the IoT device can have safe access to the wireless AP through the user terminal such as the smart phone or the like. Further, the IoT device can connect with each of the user terminal and the wireless AP in accordance with the signal strength of the communication.

The method may further include connecting with the user terminal of transmitting the first communication signal having the first signal strength in response to the first input of the user; and connecting with the communication relay of transmitting the second communication signal having the second signal strength in response to the second input of the user. Thus, the IoT device connects with the user terminal of the strongest signal strength in response to the first user input, and connects with the wireless AP designated by the user terminal in response to the second user input. That is, a user can easily control for connection with the user terminal, and connect the electronic device with the wireless AP based on the information about the connection with the wireless AP desired for connection in the user terminal, for example, the SSID and the password.

The method may further include connecting with the user terminal of transmitting the first communication signal having the first signal strength based on repetitive inputs of a user, when connecting with the external device of transmitting a third communication signal having a third signal strength higher than the first signal strength based on the first input of the user. Thus, the IoT device can connect with the user terminal of the next strongest signal strength in response to repetitive inputs of a user, when connecting with the undesired device having the strongest signal strength in response to the first input of a user.

The method may further include connecting with the user terminal of transmitting the first communication signal having the first signal strength, when the user terminal is placed within a predetermined range from the electronic device. Thus, when the user terminal moves near the IoT device, it is possible to connect with the user terminal by the strongest signal strength.

The information about the connection with the communication relay may include an SSID for accessing the communication relay and a password needed for the access. Thus, information for connecting with the AP is obtained from the user terminal, and used for connection with the wireless AP.

The object of the present disclosure is achieved by providing a display apparatus including: a display; a communicator configured to communicate with an external device; a storage; a controller configured to perform control for connecting with a communication relay of transmitting a first communication signal having a first signal strength when the first communication signal is received through the communicator, storing information about the connection with the connected communication relay in the storage, connecting with an electronic device by transmitting a second communication signal having a second signal strength lower than the first signal strength to the electronic device, and controlling the communicator to transmit the stored information about the connection with the communication relay to the connected electronic device. According to such an embodiment of the present disclosure, the smart phone or the like user terminal can provide the information about the connection with the wireless AP to the IoT device so that the IoT device can have access to the wireless AP. Further, the user terminal uses signal strength weak enough to be sensed by only the proximity device, thereby connecting with the IoT device and safely transmitting the information.

The controller may transmit the second communication signal having the second signal strength to the electronic device by transmitting a predetermined application program for implementing a communication relay function in a case of being placed within a predetermined range from the electronic device. Here, the predetermined application program may be achieved by a software enabled access point (Soft-AP). Thus, when the user terminal moves near the IoT device, the software serving as the wireless AP is executed so that the user terminal can use an absolutely-weak signal strength to connect with the IoT device. That is, when the IoT device receives a signal having the absolutely-weak signal strength from the user terminal in the proximity thereof, the user terminal can connect with the IoT device by a relatively strong signal strength.

The communicator may include at least one of a Wi-Fi module and an NFC module. Thus, the user terminal can connect with the IoT device in the proximity thereof by the Wi-Fi or NFC communication method.

The controller may transmit the second communication signal having the second signal strength to the electronic device by an NFC communication method, in a case of being placed within a predetermined range from the electronic device. Thus, when the user terminal moves near the IoT device, the NFC communication method is used for connection with the IoT device by an absolutely-weak signal strength.

The information about the connection with the communication relay may include an SSID for accessing the communication relay and a password needed for the access. Thus, the user terminal stores the information about the connection with the wireless AP, and provides the stored connection information to the IoT device, thereby making the IoT device have access to the wireless AP.

The object of the present disclosure is achieved by providing a method of controlling a display apparatus, the method including: connecting with a communication relay of transmitting a first communication signal having a first signal strength when the first communication signal is received through the communicator; storing information about the connection with the connected communication relay; connecting with an electronic device by transmitting a second communication signal having a second signal strength lower than the first signal strength to the electronic device; and transmitting the stored information about the connection with the communication relay to the connected electronic device. According to such an embodiment of the present disclosure, the smart phone or the like user terminal can provide the information about the connection with the wireless AP to the IoT device so that the IoT device can have access to the wireless AP. Further, the user terminal uses signal strength weak enough to be sensed by only the proximity device, thereby connecting with the IoT device and safely transmitting the information.

The method may further include transmitting the second communication signal having the second signal strength to the electronic device by transmitting a predetermined application program for implementing a communication relay function in a case of being placed within a predetermined range from the electronic device. Here, the predetermined application program may be achieved by a Soft-AP. Thus, when the user terminal moves near the IoT device, the software serving as the wireless AP is executed so that the user terminal can use an absolutely-weak signal strength to connect with the IoT device. That is, when the IoT device receives a signal having the absolutely-weak signal strength from the user terminal in the proximity thereof, the user terminal can connect with the IoT device by a relatively strong signal strength.

The information about the connection with the communication relay may include an SSID for accessing the communication relay and a password needed for the access. Thus, the user terminal stores the information about the connection with the wireless AP, and provides the stored connection information to the IoT device, thereby making the IoT device have access to the wireless AP.

Advantageous Effects

As described above, according to the present disclosure, strength of a signal for communication between a user's terminal and an electronic device is used to connect the electronic device to a wireless access point.

Further, according to the present disclosure, a user's terminal is used to safely connect an electronic device to the wireless access point.

Further, according to the present disclosure, it is easy for a user to connect an electronic device and a wireless access point.

DESCRIPTION OF DRAWINGS

FIG. 13 is a flowchart of showing a control method of a display apparatus according to one embodiment of the present disclosure.

BEST MODE

Hereinafter, embodiments of the present disclosure will be described in detail with reference to accompanying drawings so as to be easily realized by a person having an ordinary skill in the art to which the present disclosure pertains. The present disclosure may be embodied in various different forms, and not limited to the embodiments set forth herein. To describe the present disclosure clearly, parts unrelated to the description are omitted, and the same or like numerals refer to the same or like elements throughout.

Figure 1:
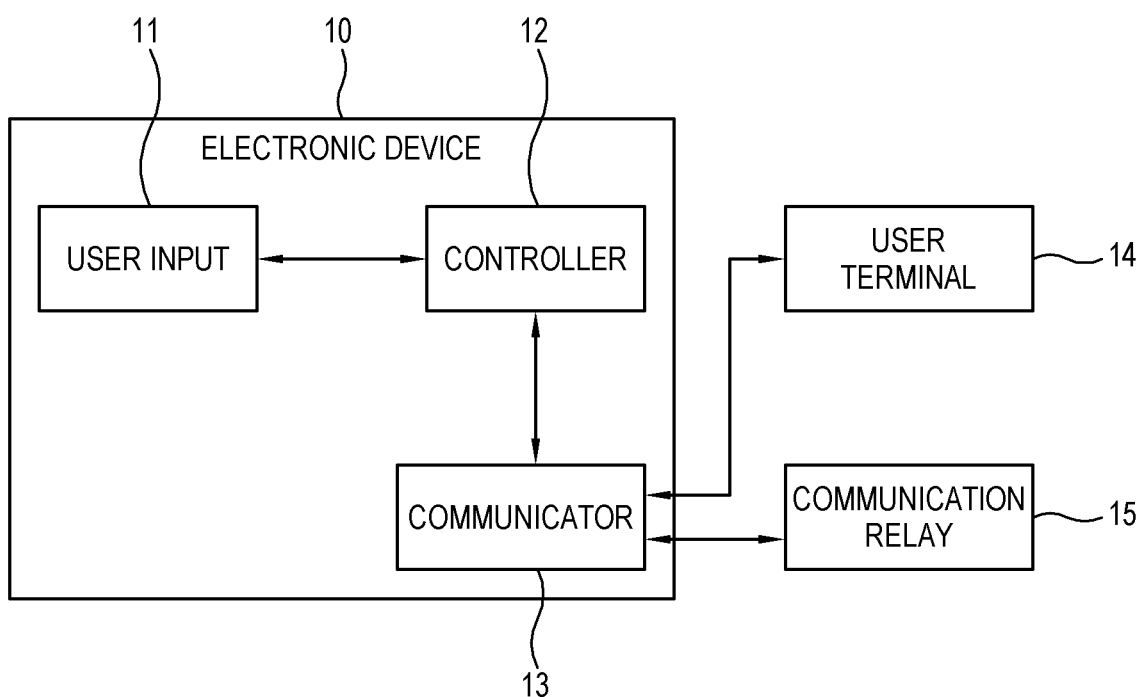
FIG. 1 is a block diagram of an electronic device according to one embodiment of the present disclosure.

Below, features of elements included in an electronic device according to the present disclosure will be first described in detail with reference to FIG. 1. FIG. 1 is a block diagram of an electronic device according to one embodiment of the present disclosure. As shown in FIG. 1, an electronic device 10 according to one embodiment of the present disclosure includes a user input 11, a controller 12 and a communicator 13, and may be for example materialized by home appliances, such as a closed circuit television (CCTV), a robot vacuum cleaner, a microwave oven, an air conditioner, a washing machine, a loudspeaker, and the like having a wireless fidelity (Wi-Fi) function. The electronic device 10 may connect with a user terminal 14 through a communication method such as Wi-Fi, near field communication (NFC), etc. The user terminal 14 may be materialized by a display apparatus, and may be for example achieved by a user's smart phone, smart watch, tablet personal computer, etc. The electronic device 10 may connect with a communication relay 15 through a communication method such as Wi-Fi, etc. The communication relay 15 functions as an access point (AP). The communication relay 15 is one of devices that constitute a wireless local area network (WLAN), and has routing and network address translation (NAT) functions to thereby for example serve as a relay of connecting with a wired LAN for the Internet. The communication relay 15 may be for example materialized by a wireless router. The elements included in the electronic device 10 according to the present disclosure are not limited to the foregoing embodiment, and may include other additional elements.

The electronic device 10 connects with the user terminal 14 of transmitting a first communication signal when the first communication signal having a first signal strength is received through the communicator 13. The electronic device 10 receives information about connection with the communication relay 15 from the connected user terminal 14. The electronic device 10 connects with the communication relay 15, which transmits a second communication signal having a second signal strength lower than the first signal strength through the communication 13, based on the received connection information.

According to this embodiment of the present disclosure, the electronic device 10 has an effect on safely accessing the wireless access point through the user terminal 14 such as a smart phone or the like. Further, it is advantageous that the strength of the signal for the communication between the electronic device 10 and the user terminal 14 is used to connect the electronic device 10 and the wireless access point.

The communicator 13 communicates with the external device. The communicator 13 may connect with the user terminal 14 and the communication relay 15. The communicator 13 may include at least one of a Wi-Fi module and an NFC module, and thus connect with the external device by the Wi-Fi or NFC communication method. Alternatively, the communicator 13 may communicate with the external device through Wi-Fi direct, Bluetooth, ZigBee, low power wireless personal area network (6LoWPAN) or the like short-range wireless communication method. The communicator 13 may perform pairing with the external device so as to communicate with the external device through the Bluetooth method.

The user input 11 receives a user's input for controlling at least one function of the electronic device 10. For example, the user input 11 may include at least one button provided at an outer side of the electronic device 10. Alternatively, the user input 11 may be materialized by a keyboard, a mouse, etc. or be materialized by an input panel provided at the outer side of the electronic device 10. Further, the user input 11 may receive a user's input from a remote controller.

According to one embodiment, the electronic device 10 may further include a storage (not shown). The storage may be configured to store information about connection with at least one communication relay 15 which has been previously connected. For example, the storage may store SSID of the communication relay 15 which has been connected using the user terminal 14 and a password needed for connection. Further, the storage may store a service set identifier (SSID) and a password for the communication relay 15, received from the user terminal 14. The SSID refers to a unique identifier attached to each header of packets transmitted through the wireless LAN, and serves to distinguish one wireless LAN from other wireless LANs. Thus, the communication relay 15 may be identified using the SSID.

The controller 12 connects with the user terminal 14 of transmitting the first communication signal when the first communication signal having the first signal strength is received through the communicator 13. According to one embodiment, the controller 12 may connect with the user terminal 14 of transmitting the first communication signal having the first signal strength, when the user terminal 14 is located within a predetermined range from the electronic device 10. In this case, the electronic device 10 is located near the user terminal 14, and thus senses the strength of the first signal transmitted from the user terminal 14 by the strongest signal strength as compared with those of other devices.

For example, when a user places the user terminal 14 near the electronic device 10 and executes software enabled access point (Soft-AP) for a virtual access point operation, the user terminal 14 serves as a virtual access point and enables the electronic device 10 to connect with the user terminal 14 by the Wi-Fi communication method. Alternatively, when a user places the user terminal 14 near the electronic device 10 in the state that the communicator 13 includes an NFC module and an NFC tag is attached to an outer side of the electronic device, the electronic device 10 can connect with the user terminal 14 by the NFC communication method.

The controller 12 performs control to receive the information about the connection with the communication relay 15 from the connected the user terminal 14, and connect with a communication relay of transmitting the second communication signal having the second signal strength lower than the first signal strength through the communicator 13 based on the received connection information. Here, the information about the connection with the communication relay 15 includes SSID and password for accessing the communication relay 15. For example, when a user places the user terminal 14 near the electronic device 10 and the user terminal 14 and the electronic device 10 are connected by the Wi-Fi or NFC communication method, the electronic device 10 receives information such as the SSID, the password, etc. for accessing the communication relay from the user terminal 14, and accesses the communication relay 15 corresponding to the received information.

According to one embodiment, the controller 12 connects with the user terminal 14, which transmits the first communication signal having the first signal strength, in response to a user's first input, and connects with the communication relay 15, which transmits the second communication signal having the second signal strength lower than the first signal strength, in response to a user's second input. For example, by pushing a button provided at the outer side of the electronic device 10, it is possible to connect with the user terminal 14 detected with the strongest signal strength within a near range from the electronic device 10. Further, by pushing the button again, it is possible to connect with the communication relay 15 detected with the next strongest signal strength. That is, in response to a user's sequential inputs to the electronic device 10, the electronic device 10 may sequentially connect with devices in order from the device of the strong signal strength to the device of the weak signal strength.

According to one embodiment, the controller 12 may connect with the user terminal 14 of transmitting the first communication signal having the first signal strength in response to a user's repetitive inputs, when connecting with an external device of transmitting a third communication signal having a third signal strength higher than the first signal strength in response to a user's first input. For example, by pushing the button provided at the outer side of the electronic device 10, it is possible to connect with a device detected with the strongest signal strength at the location of the electronic device 10. In this case, when the connected device is not desired by a user, the user pushes the button again so as to connect with the user terminal 14 detected with the next strongest signal strength. That is, the electronic device 10 connects with devices in order from the device of the strong signal strength to the device of the weak signal strength in response to a user's simple control, thereby connecting with the user terminal 14.

According to such an embodiment of the present disclosure, the electronic device 10 receives the information for accessing the wireless AP from the user terminal 14, and thus safely accesses the wireless AP. Further, only the operation of placing the user terminal 14 near the electronic device 10 is enough for a user to make the electronic device 10 access the wireless AP.

Figure 2:
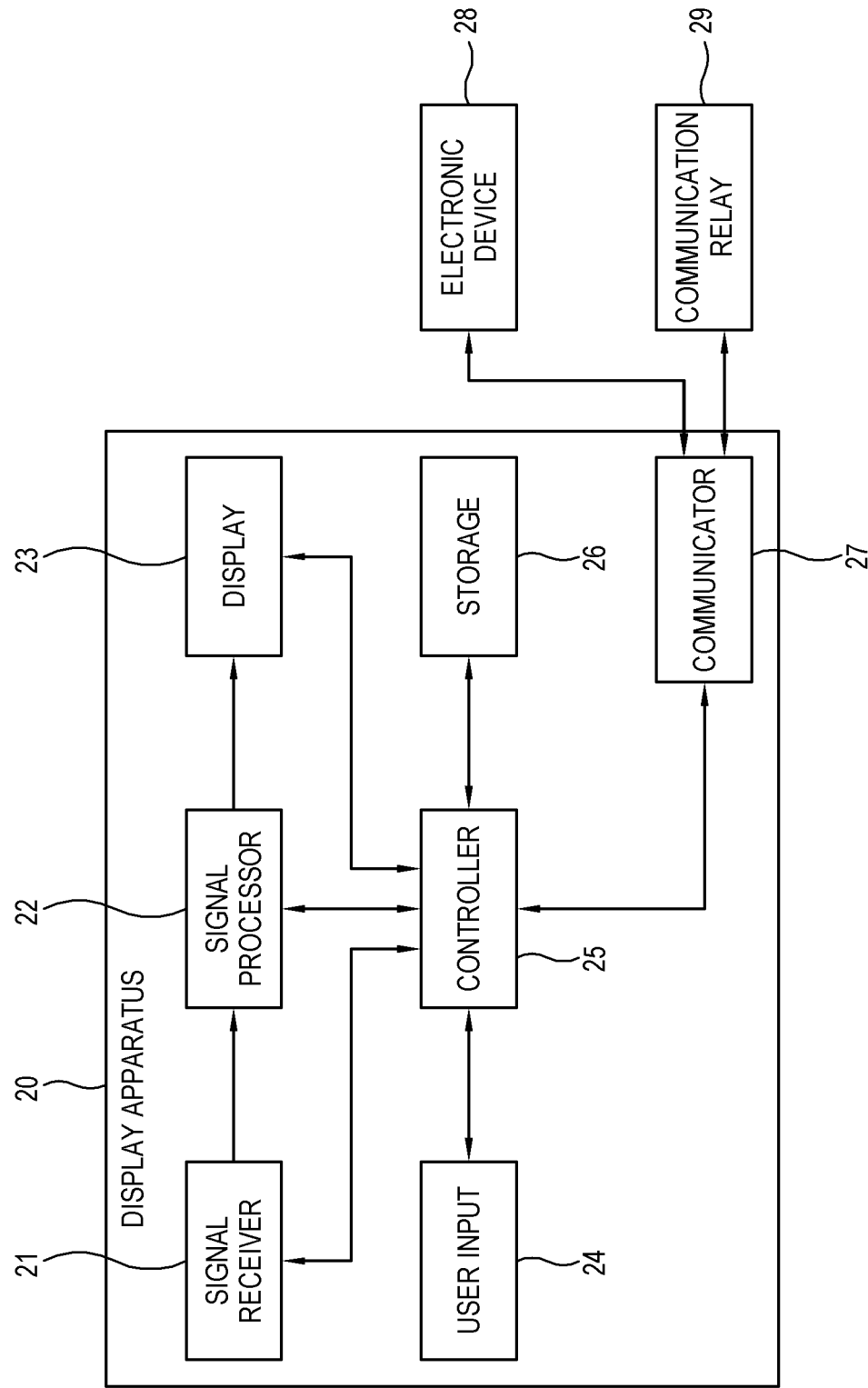
FIG. 2 is a block diagram of a display apparatus according to one embodiment of the present disclosure.

FIG. 2 is a block diagram of a display apparatus according to one embodiment of the present disclosure. As shown in FIG. 2, the display apparatus 20 of the present disclosure includes a signal receiver 21, a signal processor 22, a display 23, a user input 24, a controller 25, a storage 26 and a communicator 27, and may be for example materialized by a smart phone, a smart watch, a tablet PC, or the like user terminal. The display apparatus 20 may connect with a communication relay 29 by Wi-Fi and the like communication methods. The communication relay 29 serves as an AP. The communication relay 29 may be for example materialized by a wireless router.

The display apparatus 20 may use the Wi-Fi, NFC or the like communication method to connect with an electronic device 28. The electronic device 28 may be for example materialized by a CCTV, a robot vacuum cleaner, a microwave oven, an air conditioner, a washing machine, a loudspeaker, and the like home appliances having Wi-Fi functions. The elements included in the display apparatus 20 of the present disclosure are not limited to one embodiment described above, and may be materialized by including additional other elements.

The display apparatus 20 connects with the communication relay 29 of transmitting the first communication signal when the first communication signal having the first signal strength is received through the communicator 27, and stores the information about the connection with the connected communication relay 29. The display apparatus 20 connects with the electronic device 28 by transmitting the second communication signal having the second signal strength lower than the first signal strength to the electronic device 28. The display apparatus 20 transmits the stored information about the connection with the communication relay 29 to the connected electronic device 28.

According to such an embodiment of the present disclosure, the smart phone or the like user terminal provides the information about the connection with the wireless AP to the IoT device so that the IoT device can access the wireless AP. Further, the user terminal uses an absolutely-weak signal strength to connect with the IoT device.

The signal receiver 21 receives a broadcast signal or an image signal. The signal receiver 21 may be achieved in various forms in accordance with the formats of the received broadcast signal or image signal and the types of the display apparatus 20. For example, the signal receiver 21 may be materialized by a tuner for receiving a radio frequency broadcast signal from a broadcasting station or a satellite signal. Alternatively, the signal receiver 21 may receive an image signal from an external device connected to the display apparatus 20, for example, a digital versatile disc (DVD) player, a universal serial bus (USB) device, etc. Like this, the signal receiver 21 is not limited to one embodiment of the present disclosure, and may be materialized by various forms to receive the broadcast signal or the image signal.

The signal processor 22 performs a preset signal processing process with regard to the broadcast signal or the image signal received in the signal receiver 21. As an example of the signal processing process performed in the signal processor 22, there are decoding, de-interlacing, scaling, noise reduction, detail enhancement, etc., and there are no limits to the kinds of signal processing process. The signal processor 22 may be materialized by a system-on-chip (SoC) where such functions are integrated, or an image processing board to which individual components for independently performing the processes are mounted.

The display 23 displays an image based on the broadcast signal or image signal processed by the signal processor 22. There are no limits to the types of the display 23, and therefore the display 23 may be materialized by various types such as a plasma display panel (PDP), a liquid crystal display (LCD), an organic light emitting diode (OLED), a flexible display, etc.

The user input 24 receives a user's input for controlling at least one function of the display apparatus 20. For example, the user input 24 may include a touch screen provided in the display apparatus 20. The touch screen may be configured to sense a touch input position, a touched area, and a touch input. Further, the touch screen may be configured to sense not only a real touch but also a proximity touch. Here, the real touch refers to a case where a screen is actually touched by a user's body (e.g. a finger) or a touch pen (e.g. a pointing device, a stylus, a haptic pen, an electronic pen, etc.) provided as a touch tool. Further, the proximity touch refers to a case where a user's body or a touch tool does not actually touch the screen but approaches the screen at a predetermined distance (e.g. a detectable distance shorter than or equal to 30 mm). Alternatively, the user input 24 may be materialized by a keyboard, a mouse and the like connected to the display apparatus 20, or may be materialized by an input panel provided at the outer side of the display apparatus 20.

The communicator 27 communicates with the external device. The communicator 27 may connect with the electronic device 28 and the communication relay 29. The communicator 27 may include at least one of a Wi-Fi module and an NFC module, and thus connect with the external device by the Wi-Fi or NFC communication method. Alternatively, the communicator 27 may communicate with the external device by Wi-Fi direct, Bluetooth, ZigBee, 6lowpan, or the like short-range wireless communication. The communicator 27 may perform pairing with the external device so as to communicate with the external device by the Bluetooth method.

The storage 26 may be configured to store information about connection with at least one communication relay 15 which has been previously connected. That is, the storage 26 may store SSID and a password of the communication relay 15 which has been connected. Further, the SSID refers to a unique identifier attached to each header of packets transmitted through the wireless LAN, and serves to distinguish one wireless LAN from other wireless LANs. Thus, the communication relay 29 may be identified using the SSID.

The controller 25 connects with the communication relay 29 of transmitting the first communication signal, and stores the information about the connection with the connected communication relay 29 in the storage 26, when the first communication signal having the first signal strength is received through the communicator 27. The information about the connection with the communication relay 29 may include the SSID of the communication relay 29 and the password for the access. For example, a user may set a Wi-Fi network on a smart phone so as to access the wireless AP detected with the strongest signal strength. In this case, the smart phone stores the SSID of the connected wireless AP and the password for the access, and automatically accesses the wireless AP, to which the smart phone has been previously connected, without separate settings when the wireless AP is detected within an accessible range in the future.

The controller 25 connects with the electronic device 28 by transmitting the second communication signal having the second signal strength lower than the first signal strength to the electronic device 28. According to one embodiment, the controller 25 executes a predetermined application program for implementing a communication relay function and transmits the second communication signal having the second signal strength lower than the first signal strength to the electronic device 28 when it is within a predetermined range from the electronic device 28. Here, a predetermined application program may be achieved by a Soft-AP for performing a virtual access point operation, for example, an application program for setting tethering, mobile hot spot, or the like function. In this case, a predetermined application program may automatically run when the display apparatus 20 is within a predetermined range from the electronic device 28, or may be executed by a user's control.

For example, when a user places the smart phone or the like display apparatus 20 near the electronic device 28 and then executes the Soft-AP, the display apparatus 20 serves as a virtual access point and the electronic device 28 connects with the display apparatus 20 by the Wi-Fi communication method. In this case, the display apparatus 20 may connect with the electronic device 28 by a signal strength lower than the signal strength for connecting with the communication relay 29. That is, the display apparatus 20 executes the Soft-AP, but uses a signal strength set to be weak enough to detect only the near electronic device 28, thereby allowing only the near electronic device 28 to have access thereto.

According to another embodiment, the controller 25 may transmit the second communication signal having the second signal strength to the electronic device 28 by the NFC communication method when it is within a predetermined range from the electronic device 28. For example, when a user places the display apparatus 20 near the electronic device 28 in the state that the communicator 27 of the display apparatus 20 includes an NFC module and an NFC tag is attached to an outer side of the electronic device 28, the display apparatus 20 can connect with the electronic device 28 by the NFC communication method.

The controller 25 controls the communicator 27 to transmit the information about the connection with the communication relay 29, which is stored in the storage 26, to the connected electronic device 28. For example, when a user places the display apparatus 20 near the electronic device 28 and the display apparatus 20 and the electronic device 28 are connected by the Wi-Fi or NFC communication method, the display apparatus 20 may transmit the SSID and the password as the previously stored information about the connection with the communication relay to the electronic device 28. Thus, the display apparatus 20 may use the SSID and the password for enabling the electronic device 28 to access the communication relay 29.

Like this, according to the present disclosure, only the easy operation of placing the display apparatus 20 near the electronic device 28 is enough for a user to connect the display apparatus 20 with the electronic device 28 so that information about connection with the wireless access point can be given and the electronic device 28 can safely access the wireless access point desired by a user.

Figure 3:
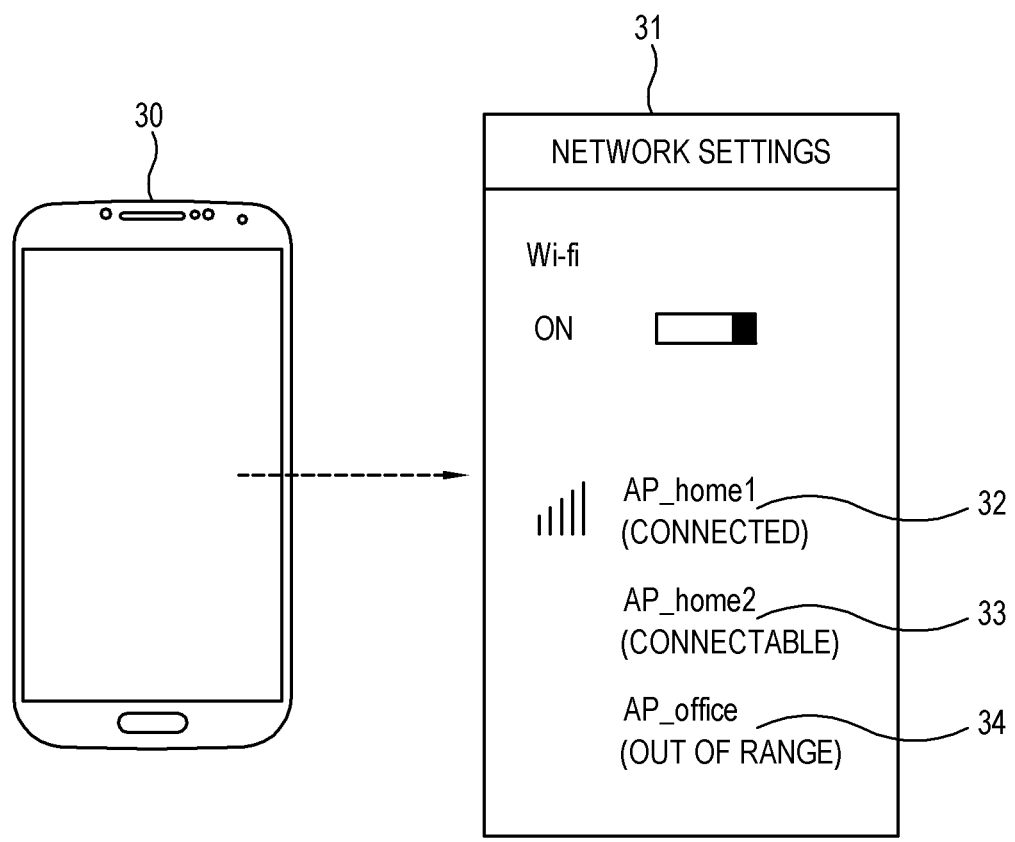
FIG. 3 illustrates an example of showing a state of being connected to a wireless AP on a smart phone according to one embodiment of the present disclosure.

FIG. 3 illustrates an example of showing a state of being connected to a wireless AP on a smart phone according to one embodiment of the present disclosure. As shown in FIG. 3, a smart phone 30 displays a setting state of a Wi-Fi network on a network setting screen 31. For example, the network setting screen 31 shows that 'AP_home1' 32 and 'AP_home2' 33 used at home and 'AP_office' 34 used at an office are registered as the wireless access points for various places. Further, the network setting screen 31 shows that the smart phone 30 is being connected to the 'AP_home1' 32 and does not connect with the 'AP_home2' 33 and the 'AP_office' 34.

According to one embodiment, the smart phone 30 may store the connection information for accessing each of the 'AP_home1' 32, the 'AP_home2' 33 and the 'AP_office' 34. When the smart phone 30 enters a region accessible to each wireless access point, the stored connection information is used for immediate access. Such information for connection with the wireless access point may include the SSID for accessing the wireless access point and the password needed for the access.

Figure 4:
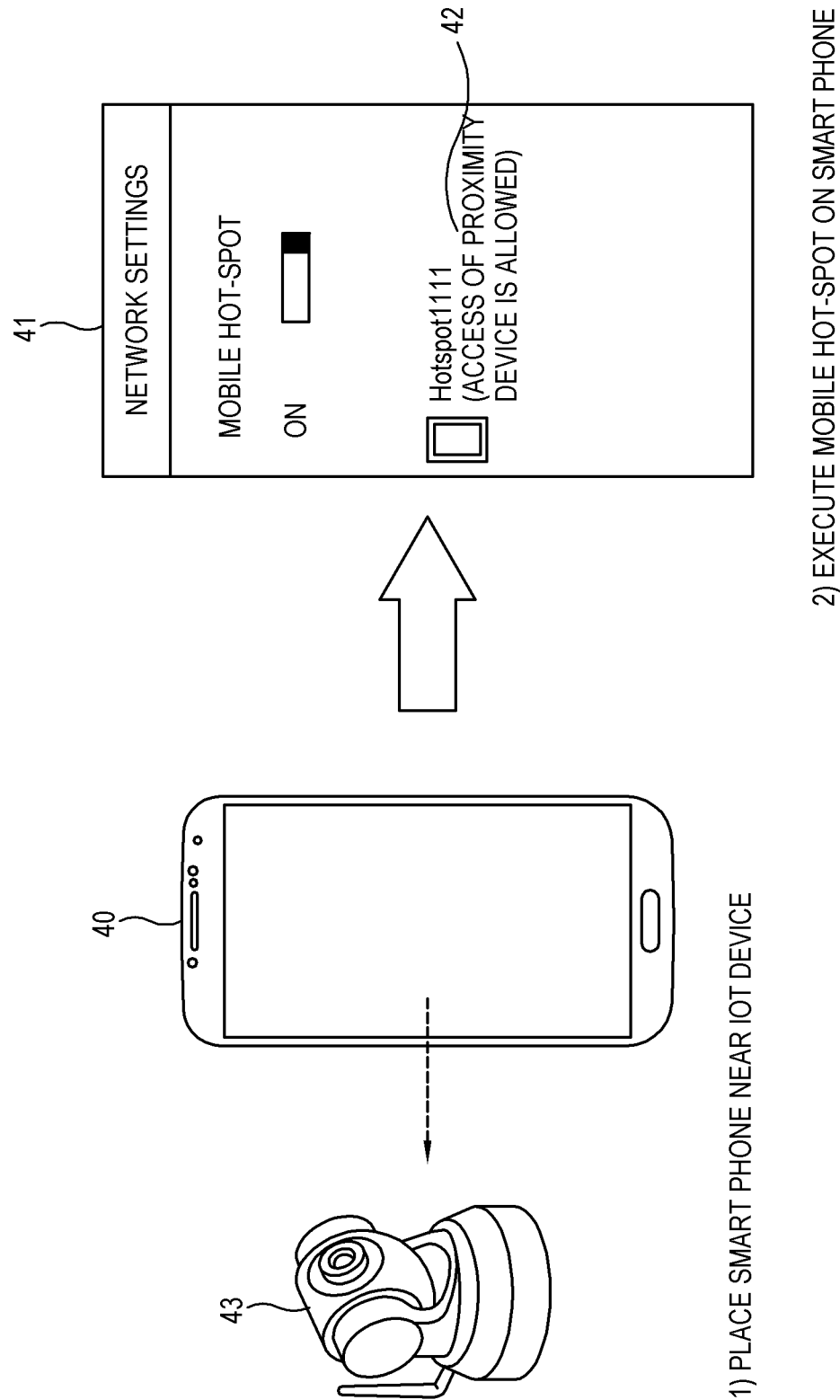
FIG. 4 illustrates an example of executing a Soft-AP and connecting with a peripheral device, on a smart phone according to one embodiment of the present disclosure.

FIG. 4 illustrates an example of executing a Soft-AP and connecting with a peripheral device on a smart phone according to one embodiment of the present disclosure. As shown in FIG. 4, when a smart phone 40 moves near an IoT device, e.g. a CCTV 43, the smart phone 40 may automatically executes the Soft-AP as a predetermined application program for operating as a virtual access point. The Soft-AP may be for example achieved by an application program for setting tethering, mobile hot-spot, or the like function. Alternatively, a user may directly execute the Soft-AP in the state that the smart phone 40 is within a predetermined range of the CCTV 43, so that the smart phone 40 can operate as the virtual access point.

In the smart phone 40, the network setting screen 41 shows that the mobile hot-spot function is running. That is, when the mobile hot-spot function is executed, the smart phone 40 generates a virtual AP such as 'Hotspot1111' 42, and allows peripheral devices to access the 'Hotspot1111' 42. In this case, when the 'Hotspot1111' 42 is set as the virtual AP, the smart phone 40 may set a signal strength to be lower than a predetermined level so as to connect with only the CCTV 43 in the proximity thereof. Thus, the smart phone 40 may use the Wi-Fi communication method to connect with the CCTV 43.

Figure 5:
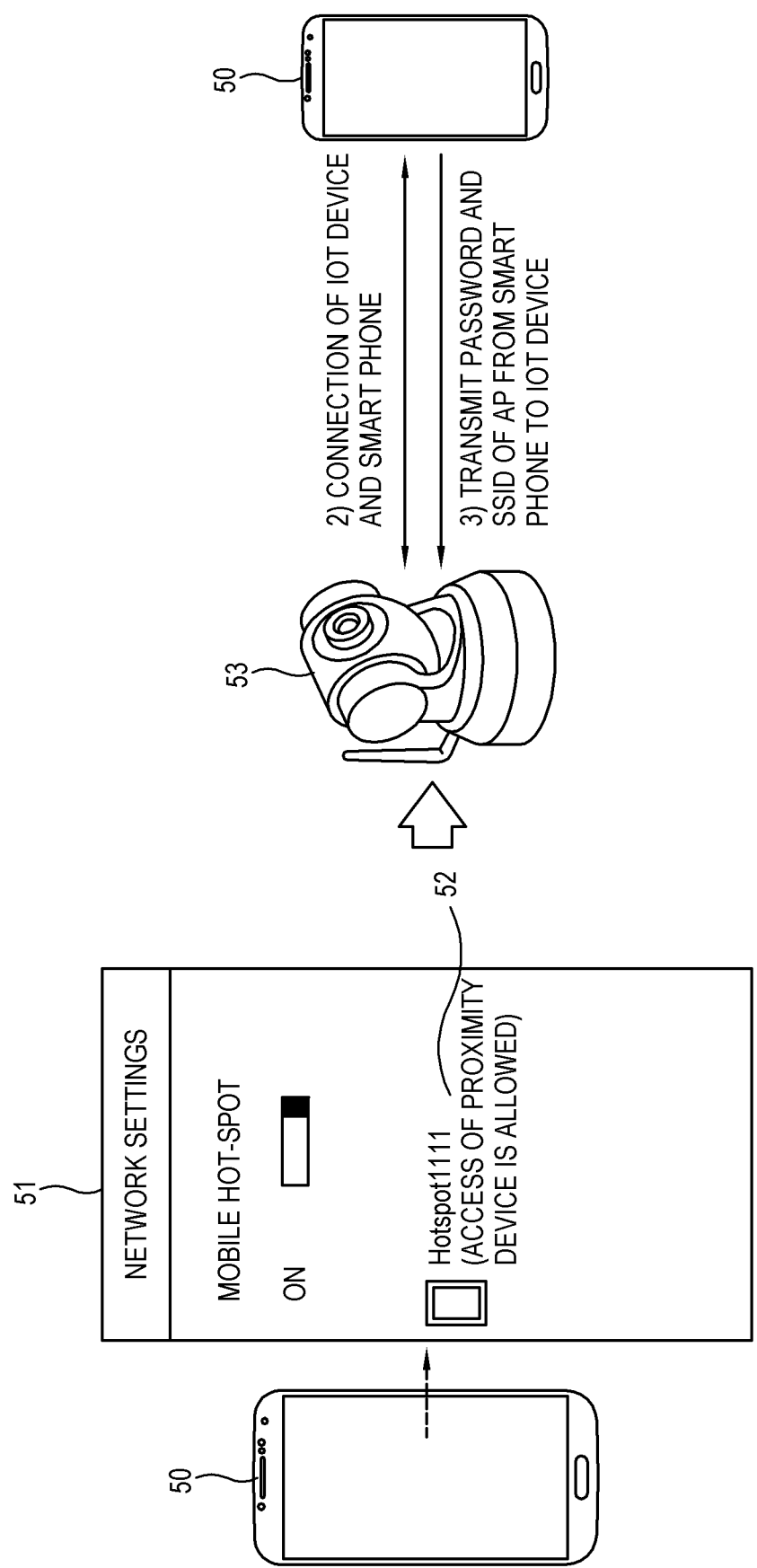
FIG. 5 illustrates an example of connecting with an IoT device and providing information about connection with the wireless AP, on a smart phone according to one embodiment of the present disclosure.

FIG. 5 illustrates an example of connecting with an IoT device and providing information about connection with the wireless AP on a smart phone according to one embodiment of the present disclosure. As shown in FIG. 5, when a user places a smart phone 50 near the CCTV 53 and for example sets the mobile hot-spot function on a network setting screen 51 of the smart phone 50, the smart phone 50 generates the virtual AP such as 'Hotspot1111' 52, and thus allows peripheral devices to access the 'Hotspot1111' 52. In this case, when the 'Hotspot1111' 52 is set as the virtual AP, the smart phone 50 may set a signal strength to be lower than a predetermined level so as to connect with only the CCTV 53 in the proximity thereof. Thus, the smart phone 50 may connect with the CCTV 53 in the proximity thereof by weak signal strength.

That is, the smart phone 50 is set for the mobile hot-spot function with a signal strength weak enough to be detected by only the CCTV 53, so that a user can easily make the smart phone 50 connect with the CCTV 53 by just moving the smart phone 50 near the CCTV 53. Thus, the safe connection between the smart phone 50 near the desired CCTV 53 is achieved as a user places the smart phone 50 near the desired CCTV 53 and automatically or manually executes the Soft-AP without any separate authentication process for connecting the smart phone 50 and the CCTV 53.

According to one embodiment, when the smart phone 50 and the CCTV 53 are connected by the foregoing methods, the smart phone 50 may form a security channel together with the connected CCTV 53. In this case, the smart phone 50 is capable of safely transmitting information to the CCTV 53 through the security channel. For example, the smart phone 50 may transmit information about the connection with the wireless access point through the security channel formed for the CCTV 53. That is, the smart phone 50 transmits information such as the SSID, password, etc. of the wireless access point, which is being connected or has been connected thereto, to the CCTV 53, and makes the CCTV 53 have access to the wireless access point based on the information. Alternatively, the smart phone 50 may safely transmit the information such as the SSID, password, etc. of the wireless access point, which is being stored or received from other devices, to the CCTV 53.

Like this, according to the present disclosure, when it is desired to connect the IoT device having no display or input device to the wireless access point, it is possible to safely transmit information about the wireless access point by making a user's terminal move near the IoT device and communicate with the IoT device by the weak signal strength.

Figure 6:
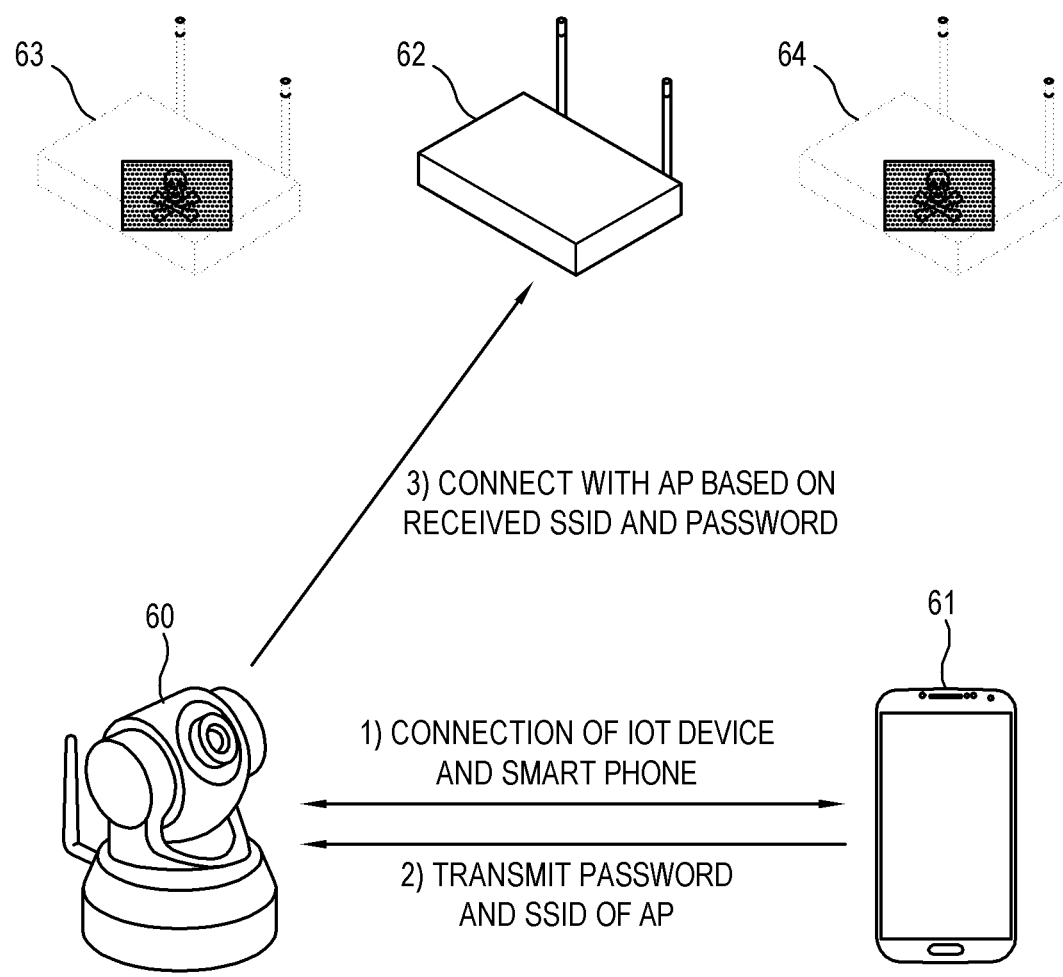
FIG. 6 illustrates an example of using information about connection with a wireless AP, received from a smart phone, to access the wireless AP in an electronic device according to one embodiment of the present disclosure.

FIG. 6 illustrates an example of using information about connection with a wireless AP, received from a smart phone, to access the wireless AP in an electronic device according to one embodiment of the present disclosure. As shown in FIG. 6, when a smart phone 61 and a CCTV 60 are connected by weak signal strength lower than a predetermined level through a Soft-AP operating as a virtual AP, a security channel is formed between the smart phone 61 and CCTV 60, so that the smart phone 61 can safely transmit the SSID and password of the wireless access point to the CCTV 60 through a security channel.

According to one embodiment, when a user wants to connect the CCTV 60 to a wireless AP 62 among a plurality of wireless APs 62, 63 and 64, the SSID and password of the wireless AP 62 are transmitted from the smart phone 61 to the CCTV 60 through the security channel, so that the CCTV 60 can safely access the wireless AP 62 based on the received SSID and password. Thus, a user can make the CCTV 60 access a desired wireless AP among the plurality of wireless APs.

Figure 7:
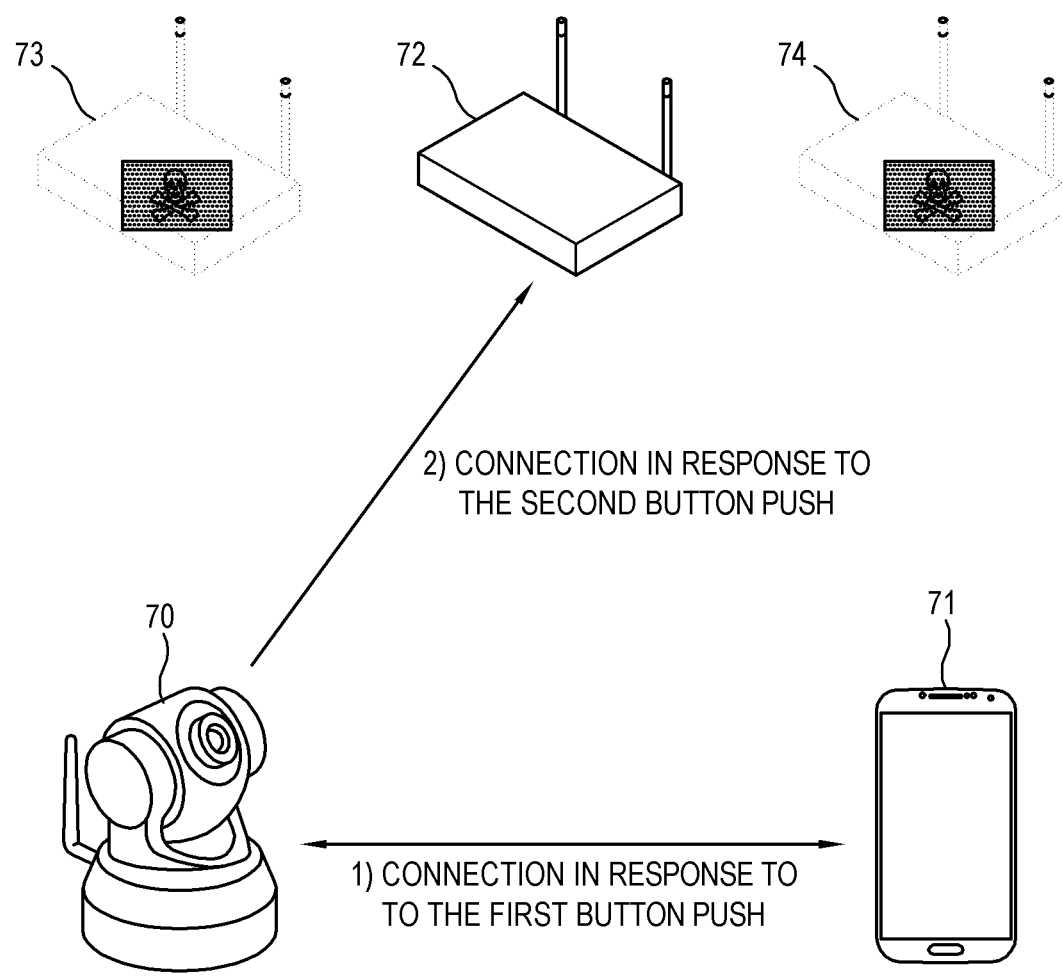
FIG. 7 illustrates an example of connecting a smart phone and a wireless AP in response to sequential button pushes, in an electronic device according to one embodiment of the present disclosure.

FIG. 7 illustrates an example of connecting a smart phone and a wireless AP in response to sequential button pushes, in an electronic device according to one embodiment of the present disclosure. As shown in FIG. 7, by pushing a button provided at an outer side of a CCTV 70, it is possible to connect with a smart phone 71 detected with the strongest signal strength among devices connectable by the Wi-Fi communication method. When the CCTV 70 connects with the smart phone 71, the CCTV 70 may receive information about connection with a wireless AP 72, for example, information such as the SSID of the wireless AP 72, the password needed for connection, etc. from the connected smart phone 71 When the button is pushed again, the CCTV 70 may connect with the wireless AP 72 detected with the next strongest signal strength, based on the SSID and the password received from the smart phone 71.

Alternatively, when the CCTV 70 connects with the smart phone 71 by pushing the button, the CCTV 70 receives information about the connection with the wireless AP 72 from the connected smart phone 71, and directly connects with the wireless AP 72 based on the received connection information without additionally pushing the button. Like this, according to the present disclosure, the IoT device connects with the user terminal of the strongest signal strength in response to the first user input, and connects with the wireless AP designed in the user terminal in response to the second user input. That is, a user can easily control the user terminal and the wireless AP to be connected in accordance with signal strength.

Figure 8:
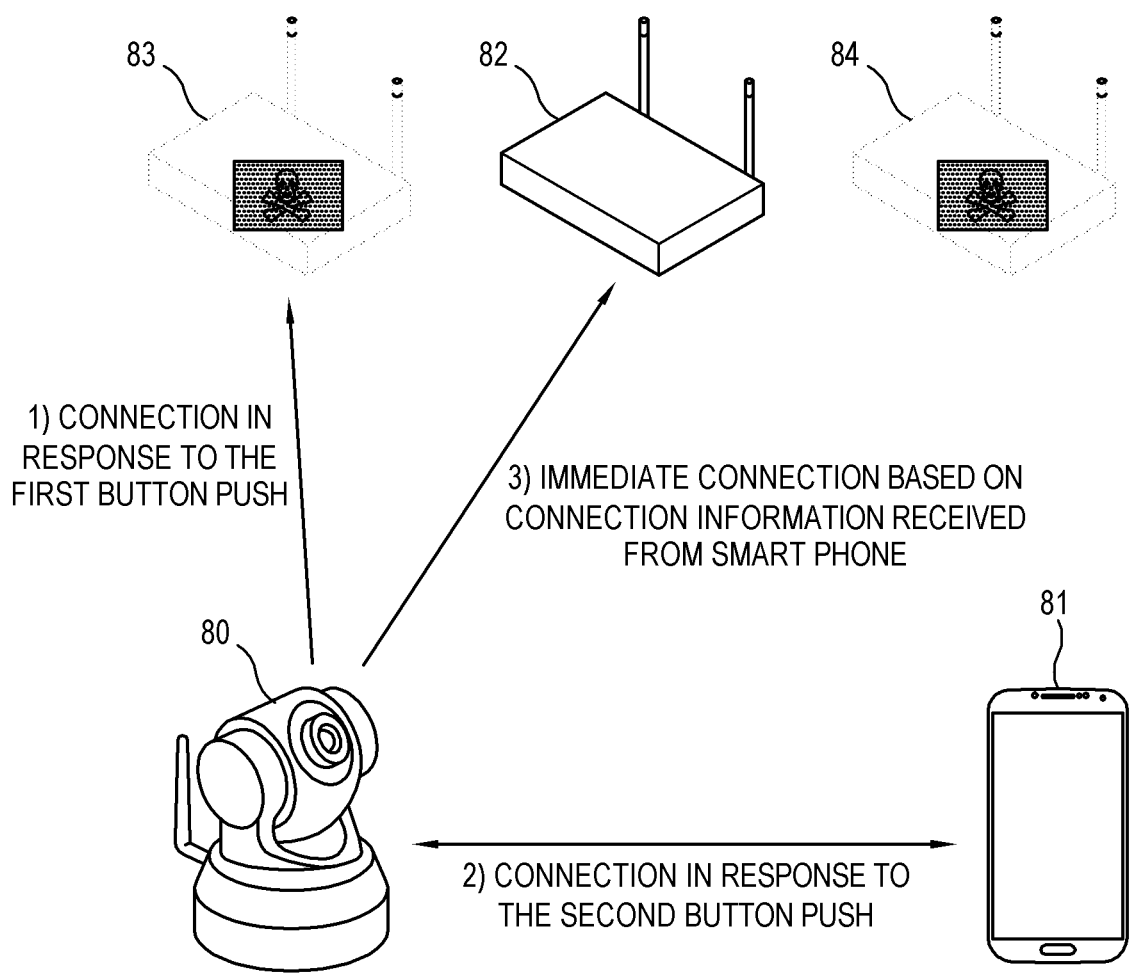
FIG. 8 illustrates an example of connecting a smart phone and a wireless AP in response to sequential button pushes, in an electronic device according to one embodiment of the present disclosure.

FIG. 8 illustrates an example of connecting a smart phone and a wireless AP in response to sequential button pushes, in an electronic device according to one embodiment of the present disclosure. As shown in FIG. 8, by pushing a button provided at an outer side of a CCTV 80, it is possible to connect with a wireless AP 83 detected with the strongest signal strength among devices connectable by the Wi-Fi communication method. In this case, when the wireless AP 83 is not the device desired by a user, it is possible to connect with a smart phone 81 detectable with the next strongest signal strength by pushing the button of the CCTV 80 again. When the CCTV 80 connects with the smart phone 81 by pushing the button twice, the CCTV 80 may receive information about connection with a wireless AP 82, for example, information such as the SSID of the wireless AP 82, the password needed for connection, etc. from the connected smart phone 81, and connect with the wireless AP 82 based on the received information.

Alternatively, the CCTV 80 may connect with the smart phone 81 and receive the information about the connection with the wireless AP 82 by pushing the button twice, and connect with the wireless AP 82 based on the connection information received from the smart phone 82 by pushing the button three times.

Like this, according to the present disclosure, the IoT device can connect with the devices in order from the device of the strong signal strength to the device of the weak signal strength in response to sequential user inputs. That is, a user's easy control is enough to connect the user terminal and the desired wireless AP.

Figure 9:
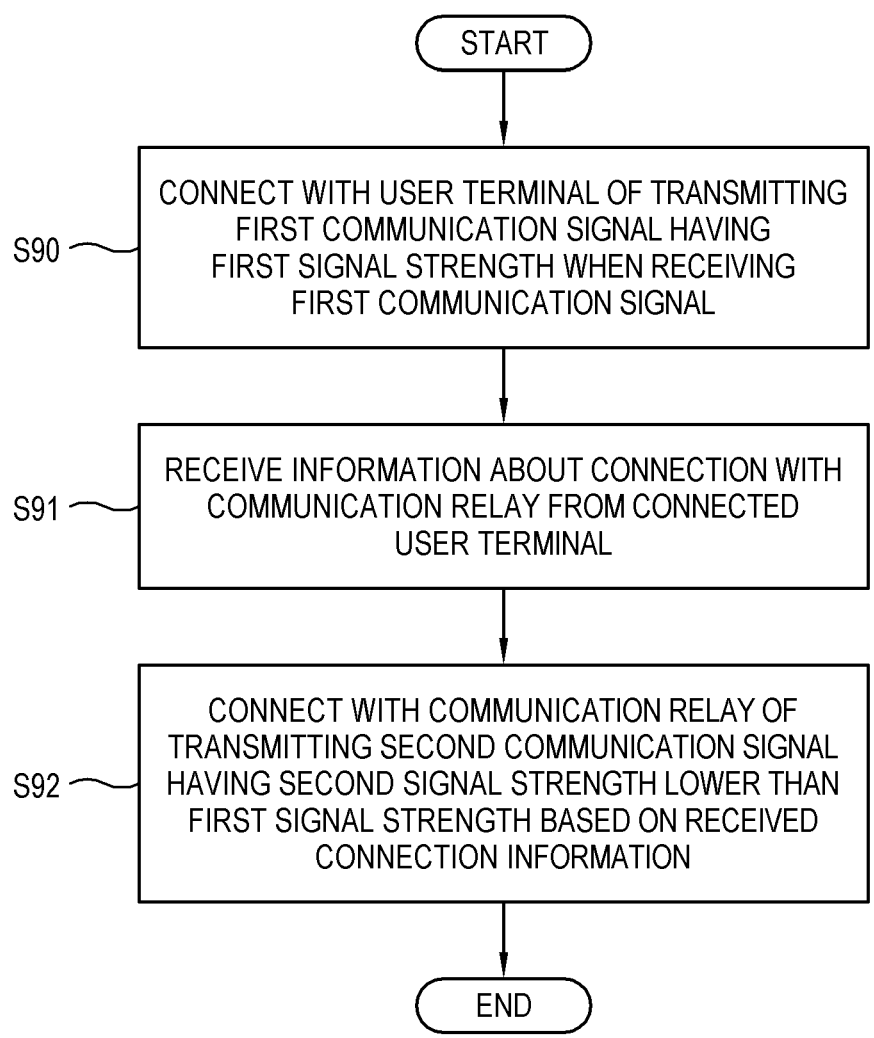
FIG. 9 is a flowchart of showing a control method of an electronic device according to one embodiment of the present disclosure.

FIG. 9 is a flowchart of showing a control method of an electronic device according to one embodiment of the present disclosure. As shown in FIG. 9, first, at operation S90, when the first communication signal having the first signal strength is received, the electronic device connects with the user terminal of transmitting the first communication signal. At operation S90, at least one of the Wi-Fi and NFC communication methods is used to connect with the user terminal.

Next, at operation S91, the information about the connection with the communication relay is received from the connected user terminal. In this case, the information about the connection with the communication relay may include information about the SSID for accessing the communication relay and the password needed for the access. Last, at operation S92, the communication relay of transmitting the second communication signal having the second signal strength lower than the first signal strength is connected based on the received connection information.

According to this present disclosure, the IoT device can safely access the wireless AP via the smart phone or the like user terminal. Further, the signal strength of the communication is used to thereby safely receive information for accessing the wireless AP from the user terminal, and thus connect with the wireless AP.

Figure 10:
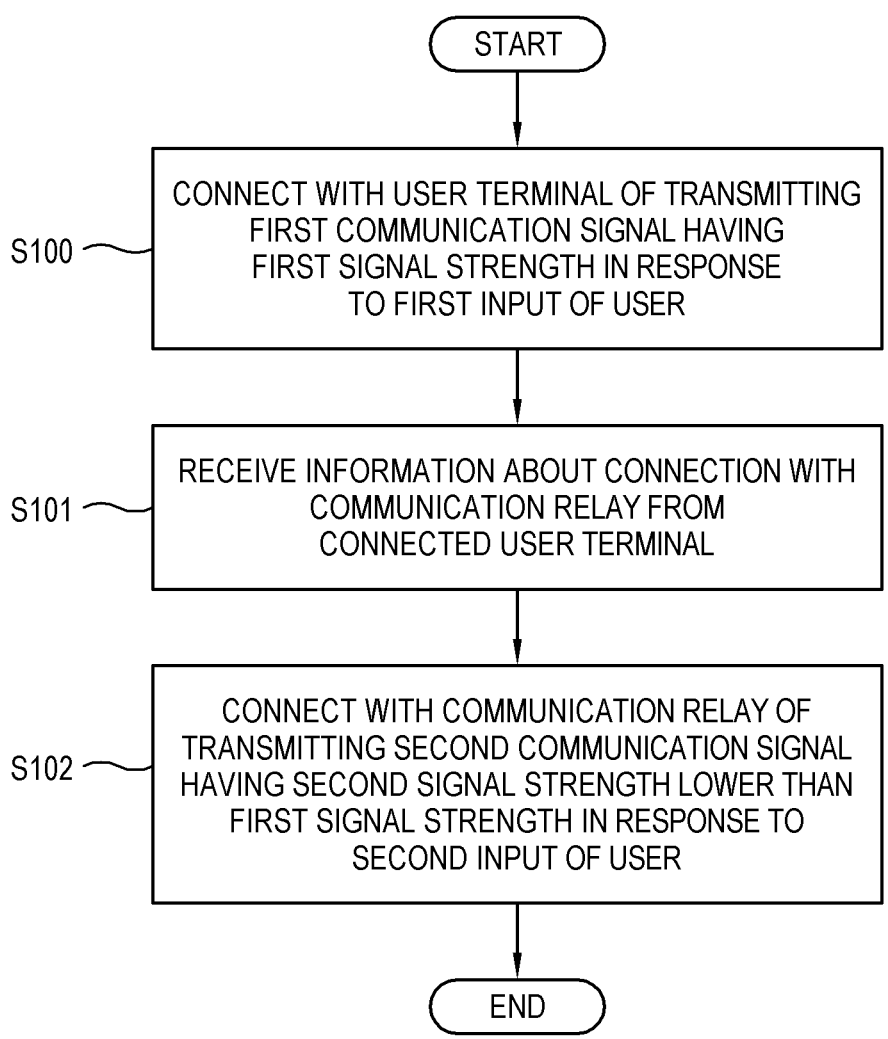
FIG. 10 is a flowchart of showing a control method of an electronic device according to one embodiment of the present disclosure.

FIG. 10 is a flowchart of showing a control method of an electronic device according to one embodiment of the present disclosure. As shown in FIG. 10, first, at operation S100, the electronic device connects with the user terminal, which transmits the first communication signal having the first signal strength, in response to the first input of a user. Next, at operation S101, the information about the connection with the communication relay is received from the connected user terminal. In this case, the information about the connection with the communication relay may include information about the SSID for accessing the communication relay and the password needed for the access. Last, at operation S102, the communication relay of transmitting the second communication signal having the second signal strength lower than the first signal strength is connected in response to the second input of a user.

Here, the first input and the second input of a user may include inputs using at least one button provided at the outer side of the electronic device. Further, the first input and the second input of a user may include inputs using an input panel provided at the outer side of the electronic device. Besides, the electronic device can receive a user's input in various ways.

For example, as shown in FIG. 7, by pushing the button provided at the outer side of the CCTV 70, it is possible to connect with the smart phone 71 detected with the strongest signal strength among the devices connectable by the Wi-Fi communication method. In this case, the CCTV 70 may receive information, such as the SSID of the wireless AP 72, the password needed for the access, etc. from the connected smart phone 71. When the button is pushed again, the CCTV 70 may connect with the wireless AP 72 detectable with the next strongest signal strength by using the SSID and the password received from the smart phone 71.

Figure 11:
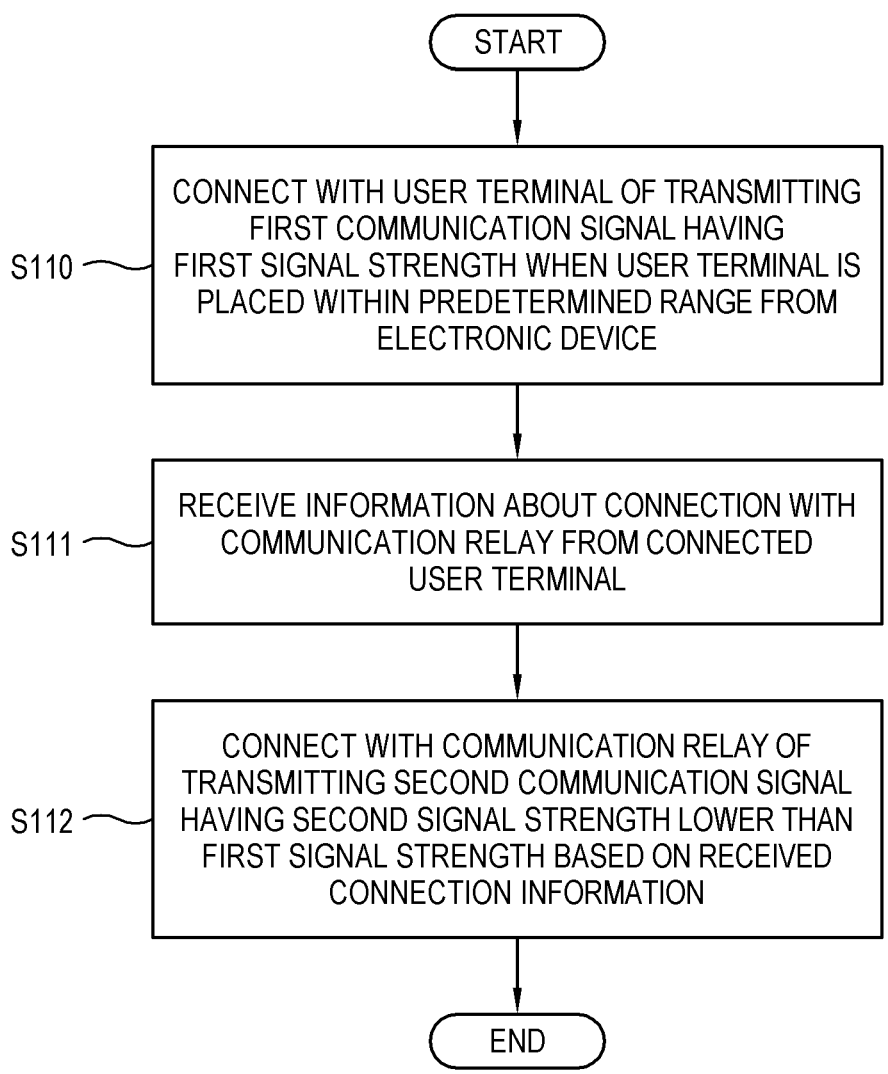
FIG. 11 is a flowchart of showing a control method of an electronic device according to one embodiment of the present disclosure.

FIG. 11 is a flowchart of showing a control method of an electronic device according to one embodiment of the present disclosure. As shown in FIG. 11, first, at operation S110, the electronic device connects with the user terminal of transmitting the first communication signal having the first signal strength, when the user terminal is placed within a predetermined range from the electronic device. According to one embodiment, the user terminal in the proximity of the electronic device executes the Soft-AP for operating as the virtual AP, and sets the signal strength to be weak enough to be detectable by only the near electronic device. In this case, the electronic device detects the strongest signal strength of the user terminal in the proximity thereof and connects with the user terminal. When the electronic device and the user terminal are connected, a security channel may be formed between them so that the electronic device and the user terminal can exchange data and information with each other through the security channel.

According to another embodiment, when the user terminal moves near the electronic device in the state that each of the electronic device and the user terminal includes an NFC module and an NFC tag is attached to the electronic device, the electronic device and the user terminal may be connected by the NFC communication method. In this case, an NFC channel may be formed between the electronic device and the user terminal, so that the electronic device and the user terminal can exchange data and information with each other through the NFC channel.

Next, at operation S111, the information about the connection with the communication relay is received from the connected user terminal. The information about the connection with the communication relay may include information about the SSID for accessing the communication relay and the password needed for the access. In this case, the information about the connection with the communication relay may include information about the connection with the wireless AP, to which the user terminal is being connected, or information about the connection with the wireless AP, which has been registered in the user terminal. Besides, the information about the connection with the communication relay may include information about the connection with the wireless AP, which the user terminal receives from another external device.

Last, at operation S112, the communication relay of transmitting the second communication signal having the second signal strength lower than the first signal strength is connected based on the received connection information. That is, the electronic device can access the wireless AP detected with the next strongest signal strength, based on the information such as the SSID of the wireless AP and the password received from the user terminal detected with the strongest signal strength.

Like this according to the present disclosure, by placing the user terminal in the proximity of the IoT device, the IoT device connects with the user terminal with the strongest signal strength and safely receives the information about the connection with the wireless AP. Further, the information received from the user terminal is used to have access to the wireless AP.

Figure 12:
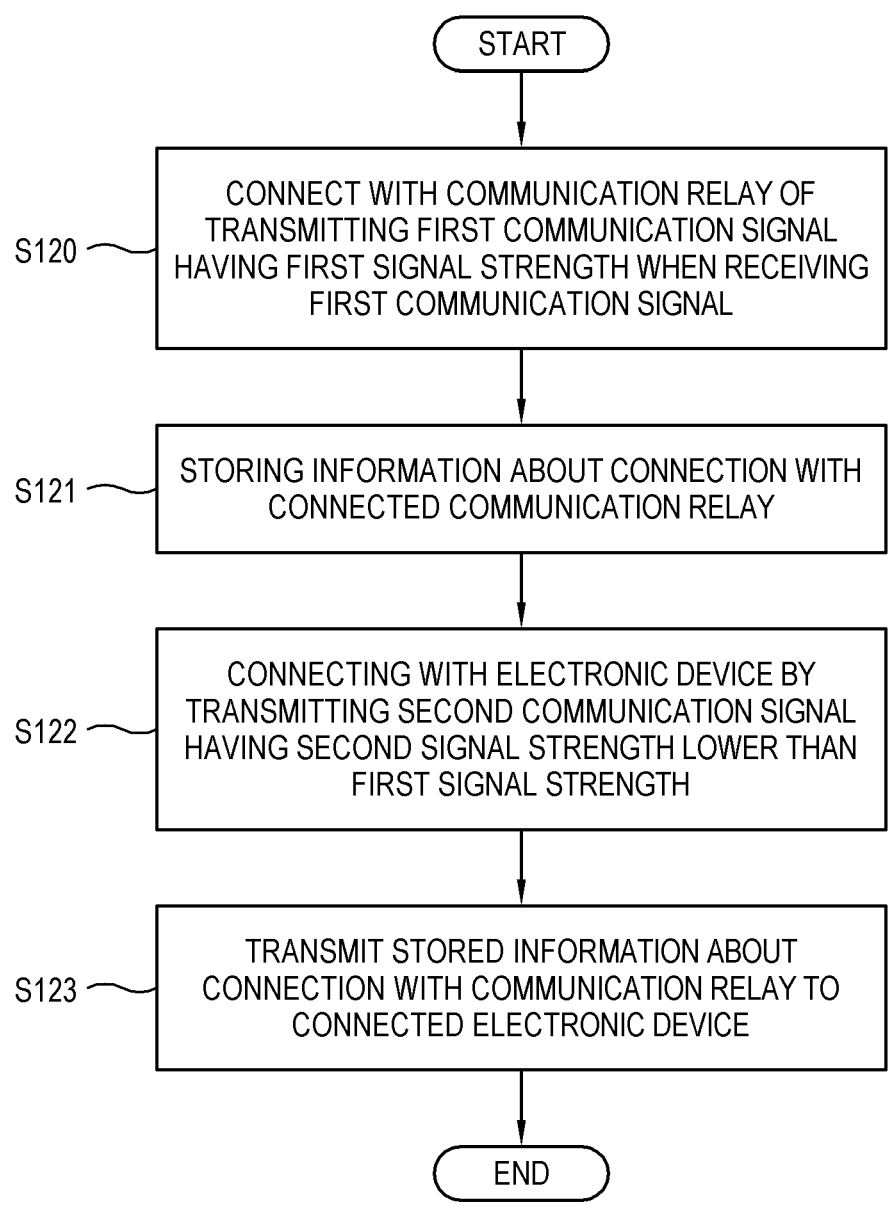
FIG. 12 is a flowchart of showing a control method of a display apparatus according to one embodiment of the present disclosure.

FIG. 12 is a flowchart of showing a control method of a display apparatus according to one embodiment of the present disclosure. As shown in FIG. 12, first, at operation S120, the display apparatus connects with the communication relay of transmitting the first communication signal when the first communication signal having the first signal strength is received. Next, at operation S121, the information about the connection with the connected communication relay is stored. The information about the connection with the communication relay may include information about the SSID for accessing the communication relay and the password needed for the access. For example, as shown in FIG. 3, the smart phone 30 may display the network setting screen 31 of showing the setting state of the Wi-Fi network, in which the smart phone 30 is being connected to the 'AP_home1' 32 among the registered wireless access points, and does not connect with the 'AP_home2' 33 and the 'AP_office' 34. In this case, the SSID of the 'AP_home1' 32 and the password needed for the access may be stored as the information about the connection with the currently connected 'AP_home1' 32. Further, with regard to other registered communication relays, such as the 'AP_home2' 33 and the 'AP_office' 34, the SSID and the password for accessing each of them may be stored.

Next, at operation S122, the connection is achieved by transmitting the second communication signal having the second signal strength lower than the first signal strength to the electronic device. In this case, to set the second signal strength lower than the first signal strength, the Soft-AP function may be implemented in the proximity of the electronic device. Thus, only the electronic device in the proximity of the display apparatus is allowed to detect the second communication signal transmitted from the display apparatus and connected to the display apparatus. Last, at operation S12, the stored information about the connection with the communication relay is transmitted to the connected electronic device.

Like this, according to the present disclosure, the smart phone or the like user terminal provides the information about the connection with the wireless AP to the IoT device so that the IoT device can have access to the wireless AP. Further, the user terminal connects with the IoT device based on the signal strength weak enough to be detectable by only the device in the proximity thereof, and it is thus possible to safely transmit the information.

FIG. 13 is a flowchart of showing a control method of a display apparatus according to one embodiment of the present disclosure. As shown in FIG. 13, first, at operation S130, when the display apparatus is placed within a predetermined range from the electronic device, a predetermined application program is executed so that the connection is achieved by transmitting the second communication signal having the second signal strength to the electronic device. In this case, a predetermined application program may be achieved by the Soft-AP. For example, as shown in FIG. 5, when a user places the smart phone 50 near the CCTV 53 and for example starts the mobile hot-spot function through the network setting screen 51 of the smart phone 50, the smart phone 50 generates the virtual AP such as the 'Hotspot1111' 52 and thus allows access of peripheral devices to the 'Hotspot1111' 52. In this case, the smart phone 50 may set the virtual AP, i.e. the 'Hotspot1111' 52 to have the signal strength lower than a predetermined level so that only the CCTV 53 in the proximity thereof can have access. Thus, the smart phone 50 can access the CCTV 53 within a proximity range by the weak signal strength. Last, at operation S131, the information about the connection with the communication relay is transmitted to the connected electronic device.

Although preferred embodiments of the present disclosure are described in detail, the present disclosure is not limited to these embodiment and various changes can be made without departing from the scope defined the appended claims.

The invention claimed is:

1. An electronic device comprising:
   a user input unit configured to receive an input of a user;
   a communicator configured to communicate with a user terminal and a communication relay; and
   at least one processor configured to perform control for:
      based on the user terminal being positioned within a predetermined range from the electronic device, identifying the user terminal as a device of strongest signal strength from among a plurality of devices comprising the user terminal and the communication relay,
      based on a user input via the user input unit, connecting with the user terminal identified as the device of the strongest signal strength through the communicator,
      receiving information about connection with the communication relay from the user terminal, and
      based on the received information about connection with the communication relay, connecting with the communication relay through the communicator,
   wherein the user input comprises a button push on the electronic device.

2. The electronic device according to claim 1,
   wherein the at least one processor is further configured to, based on a second user input via the user input unit and the received information about connection with the communication relay, connect with the communication relay through the communicator, and
   wherein the second user input comprises a second button push on the electronic device.

3. The electronic device according to claim 1,
   wherein the communicator is further configured to communicate with another communication relay, and
   wherein the at least one processor is further configured to connect with the other communication relay when the user input is received and if the other communication relay is identified as a third device of stronger signal strength than the user terminal.

4. The electronic device according to claim 1, wherein the user input unit comprises at least one button provided at an outer side of the electronic device.

5. The electronic device according to claim 1, wherein the communicator comprises at least one of a Wi-Fi module or a near field communication (NFC) module.

6. A method of controlling an electronic device, the method comprising:
   receiving a first communication signal through a communicator from a user terminal, and receiving a second communication signal from a communication relay;
   based on the user terminal being positioned within a predetermined range from the electronic device, identifying the user terminal as a device of strongest signal strength from among a plurality of devices comprising the user terminal and the communication relay;
   based on a user input, connecting with the user terminal identified as the device of the strongest signal strength through the communicator;
   receiving information about connection with the communication relay from the user terminal; and
   based on received information about connection with the communication relay, connecting with the communication relay through the communicator,
   wherein the user input comprises a button push on the electronic device.

7. The method according to claim 6,
   wherein the connecting with the communication relay comprises, based on a second user input and the received information about connection with the communication relay, connecting with the communication relay through the communicator, and
   wherein the second user input comprises a second button push on the electronic device.

* * * * *